(12) United States Patent
Lee

(10) Patent No.: US 12,495,194 B2
(45) Date of Patent: Dec. 9, 2025

(54) CAMERA DEVICE AND ELECTRONIC DEVICE COMPRISING CAMERA DEVICE

(71) Applicant: Samsung Electronics Co., Ltd., Suwon-si (KR)

(72) Inventor: Soyeong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 18/431,179

(22) Filed: Feb. 2, 2024

(65) Prior Publication Data

US 2024/0172353 A1    May 23, 2024

Related U.S. Application Data

(63) Continuation of application No. PCT/KR2022/011651, filed on Aug. 5, 2022.

(30) Foreign Application Priority Data

Aug. 5, 2021 (KR) .................. 10-2021-0103175
Nov. 10, 2021 (KR) .................. 10-2021-0153683

(51) Int. Cl.
*H04N 23/52* (2023.01)
*G03B 17/08* (2021.01)
(Continued)

(52) U.S. Cl.
CPC ............. *H04N 23/52* (2023.01); *G03B 17/08* (2013.01); *G03B 30/00* (2021.01);
(Continued)

(58) Field of Classification Search
CPC ..... H05F 3/00; H05F 1/00; H05F 1/02; G03B 17/02; G03B 17/08; G03B 2217/00;
(Continued)

(56) References Cited

U.S. PATENT DOCUMENTS

2007/0201174 A1   8/2007  Hynes et al.
2008/0225468 A1*  9/2008  Huang ................ H05K 9/0067
                                                                361/724
(Continued)

FOREIGN PATENT DOCUMENTS

CN    107454295 A  * 12/2017  ............. H04N 23/57
CN    207070127 U     3/2018
(Continued)

OTHER PUBLICATIONS

Extended European Search Report dated Oct. 10, 2024, issued in European Patent Application No. 22853537.3.
(Continued)

*Primary Examiner* — Twyler L Haskins
*Assistant Examiner* — Akshay Trehan
(74) *Attorney, Agent, or Firm* — Jefferson IP Law, LLP

(57) ABSTRACT

An electronic device is provided. The electronic device includes a housing including an opening, a printed circuit board (PCB) disposed inside the housing, and a camera deco part disposed inside the opening and covering a camera assembly. The camera deco part includes a first metal portion having a first surface at least partially exposed to an outside of the electronic device, the first surface including an oxide coating layer, and a second surface including no oxide coating layer, a second metal portion having a third surface at least partially exposed to an outside of the electronic device, the third surface including an oxide coating layer, and a fourth surface including no oxide coating layer, the fourth surface facing the PCB, and a first adhesive portion located between the second surface of the first metal portion and the fourth surface of the second metal portion, the first adhesive portion including at least one recess.

20 Claims, 14 Drawing Sheets

(51) Int. Cl.
    *G03B 30/00*     (2021.01)
    *H04M 1/02*     (2006.01)
    *H04N 23/50*     (2023.01)
    *H04N 23/51*     (2023.01)
    *H04N 23/57*     (2023.01)
    *H05F 1/02*     (2006.01)
    *H05F 3/00*     (2006.01)

(52) U.S. Cl.
    CPC .......... *H04M 1/0264* (2013.01); *H04N 23/50* (2023.01); *H04N 23/57* (2023.01); *H05F 3/00* (2013.01); *H04M 1/0277* (2013.01); *H04M 1/0283* (2013.01); *H04N 23/51* (2023.01); *H05F 1/02* (2013.01)

(58) Field of Classification Search
    CPC .. G03B 2217/002; G03B 30/00; H04N 23/50; H04N 23/51; H04N 23/52; H04N 23/54; H04N 23/55; H04N 23/57; H04M 1/0264; H04M 1/0277; H04M 1/0283
    See application file for complete search history.

(56) References Cited

U.S. PATENT DOCUMENTS

| | | |
|---|---|---|
| 2011/0050986 A1 | 3/2011 | Wang |
| 2014/0104742 A1* | 4/2014 | Kumoi .................. G03B 17/02 361/220 |
| 2014/0253799 A1 | 9/2014 | Moon et al. |
| 2015/0366110 A1 | 12/2015 | Park et al. |
| 2016/0163690 A1 | 6/2016 | Ko et al. |
| 2017/0043372 A1 | 2/2017 | Iwamoto et al. |
| 2021/0112184 A1 | 4/2021 | Jarvis et al. |
| 2021/0144242 A1* | 5/2021 | Choi ..................... G06F 1/1684 |

FOREIGN PATENT DOCUMENTS

| | | | |
|---|---|---|---|
| CN | 107682478 B | 7/2020 | |
| CN | 108881681 B | 4/2021 | |
| CN | 112929547 B | 6/2021 | |
| KR | 10-2005-0020516 A | 3/2005 | |
| KR | 10-2007-0016329 A | 2/2007 | |
| KR | 20070016329 A * | 2/2007 | .......... H04M 1/0277 |
| KR | 10-2009-0017472 | 2/2009 | |
| KR | 10-2014-0111503 | 9/2014 | |
| KR | 10-2014-0137669 | 12/2014 | |
| KR | 10-2015-0142386 A | 12/2015 | |
| KR | 10-2016-0069166 | 6/2016 | |
| KR | 10-2016-0142386 A | 12/2016 | |
| KR | 10-2019-0053017 | 5/2019 | |
| KR | 10-2021-0060999 | 5/2021 | |
| KR | 10-2021-0155598 | 12/2021 | |

OTHER PUBLICATIONS

International Search Report dated Nov. 14, 2022, issued in International Patent Application No. PCT /KR2022/011651.

* cited by examiner

CAMERA DEVICE AND ELECTRONIC DEVICE COMPRISING CAMERA DEVICE

CROSS-REFERENCE TO RELATED APPLICATION(S)

This application is a continuation application, claiming priority under § 365(c), of an International application No. PCT/KR2022/011651, filed on Aug. 5, 2022, which is based on and claims the benefit of a Korean patent application number 10-2021-0103175, filed on Aug. 5, 2021, in the Korean Intellectual Property Office, and of a Korean patent application number 10-2021-0153683, filed on Nov. 10, 2021, in the Korean Intellectual Property Office, the disclosure of which is incorporated by reference herein in its entirety.

BACKGROUND

1. Field

The disclosure relates to a camera device capable of discharging static electricity and an electronic device including the same.

2. Description of Related Art

An electronic device may refer to any device that performs a specific function according to a loaded program, such as a home appliance, an electronic notebook, a portable multimedia player, a mobile communication terminal, a tablet personal computer (PC), a video/audio device, a desktop/laptop computer, a car navigator, and so on. For example, these electronic devices may output stored information as sound or an image. As the integration level of electronic devices has increased and high-speed, large-capacity wireless communications have become more common, a single electronic device, such as a mobile communication terminal, may be equipped with a variety of functions. For example, in addition to a communication function, an entertainment function such as games, a multimedia function such as music and video playback, a communication and security function for mobile banking, and functions such as scheduling or an electronic wallet are integrated into one electronic device.

Various modules are arranged in the electronic device, which is commercialized with a camera lens assembly (hereinafter, referred to as a 'camera module' or a 'camera device') capable of taking pictures, videos, and so on disposed therein.

The above information is presented as background information only to assist with an understanding of the disclosure. No determination has been made, and no assertion is made, as to whether any of the above might be applicable as prior art with regard to the disclosure.

SUMMARY

A camera device may be disposed inside a portable or miniaturized electronic device, at least partially exposed from a surface of the electronic device. For example, the camera device should have an open structure on the surface of the electronic device. When the camera device has a structure exposed from the surface of the electronic device, it may be disposed together with a metallic deco to provide a sense of sophistication or diversify design. For example, the metal deco may be fixed around the periphery of the camera device and located between the camera device and an arrangement surface of the electronic device.

When static electricity is generated from the outside of the electronic device, the static electricity may be introduced into the camera device through the metal deco, and thus cause the camera device to break or malfunction. Moreover, the static electricity may affect other modules disposed in the electronic device, thereby causing various errors such as malfunction as well as damage or breakage.

Aspects of the disclosure are to address at least the above-mentioned problems and/or disadvantages and to provide at least the advantages described below. Accordingly, an aspect of the disclosure is to provide an electronic device including a camera device that secures an inflow path allowing static electricity to move toward a discharge module, when the static electricity is introduced into a camera module through a metal deco.

Additional aspects will be set forth in part in the description which follows and, in part, will be apparent from the description, or may be learned by practice of the presented embodiments.

In accordance with an aspect of the disclosure, an electronic device is provided. The electronic device includes a housing including an opening, a printed circuit board (PCB) disposed inside the housing, and a camera deco part disposed inside the opening and covering a camera assembly. The camera deco part includes a first metal portion including a first surface at least partially exposed to an outside of the electronic device, the first surface having an oxide coating layer formed thereon and a second surface having no oxide coating layer formed thereon, a second metal portion including a third surface at least partially exposed to the outside of the electronic device, the third surface having an oxide coating layer formed thereon and a fourth surface having no oxide coating layer formed thereon, the fourth surface facing the PCB, and a first adhesive portion located between the second surface of the first metal portion and the fourth surface of the second metal portion, the first adhesive portion including at least one recess.

In accordance with another aspect of the disclosure, a camera deco part covering a camera assembly is provided. The camera deco part covering a camera assembly includes a first metal portion including a first surface at least partially exposed to an outside of an electronic device, the first surface having an oxide coating layer formed thereon and a second surface having no oxide coating layer formed thereon, a second metal portion including a third surface at least partially exposed to the outside of the electronic device, the third surface having an oxide coating layer formed thereon and a fourth surface having no oxide coating layer formed thereon, the fourth surface facing a PCB, and first adhesive portion located between the second surface of the first metal portion and the fourth surface of the second metal portion, the first adhesive portion including at least one recess.

According to various embodiments of the disclosure, a camera deco part covering a camera assembly includes a plurality of metal portions, for design differentiation. Static electricity from the outside of an electronic device may travel through a surface of a first metal portion, on which an oxide coating film is not formed, and be effectively transferred to a printed circuit board disposed inside the electronic device without being blocked by the oxide coating film.

Static electricity from the outside of the electronic device may be effectively transferred to the printed circuit board disposed inside the electronic device without being blocked by an oxide coating layer, by a surface of a second metal portion, on which an oxide coating layer is not formed.

According to various embodiments of the disclosure, as an adhesive portion includes at least one recess, and the width of at least a portion of the adhesive portion is reduced by a recess portion, the width of a portion in which metal portions face each other without contacting the adhesive portion may be increased.

According to various embodiments of the disclosure, when static electricity from the outside of the electronic device is introduced into a camera module through metal portions, the static electricity may be transferred to the printed circuit board through a surface of a metal portion, on which an oxide coating layer is not formed, a surface of another metal portion, on which an oxide coating layer is not formed, and a conductive sponge. As a conduction path of static electricity is widened, it is possible to reduce the chance of static electricity entering the electronic device through the camera module and causing damage to the camera device, or even affecting and damaging other modules disposed in the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
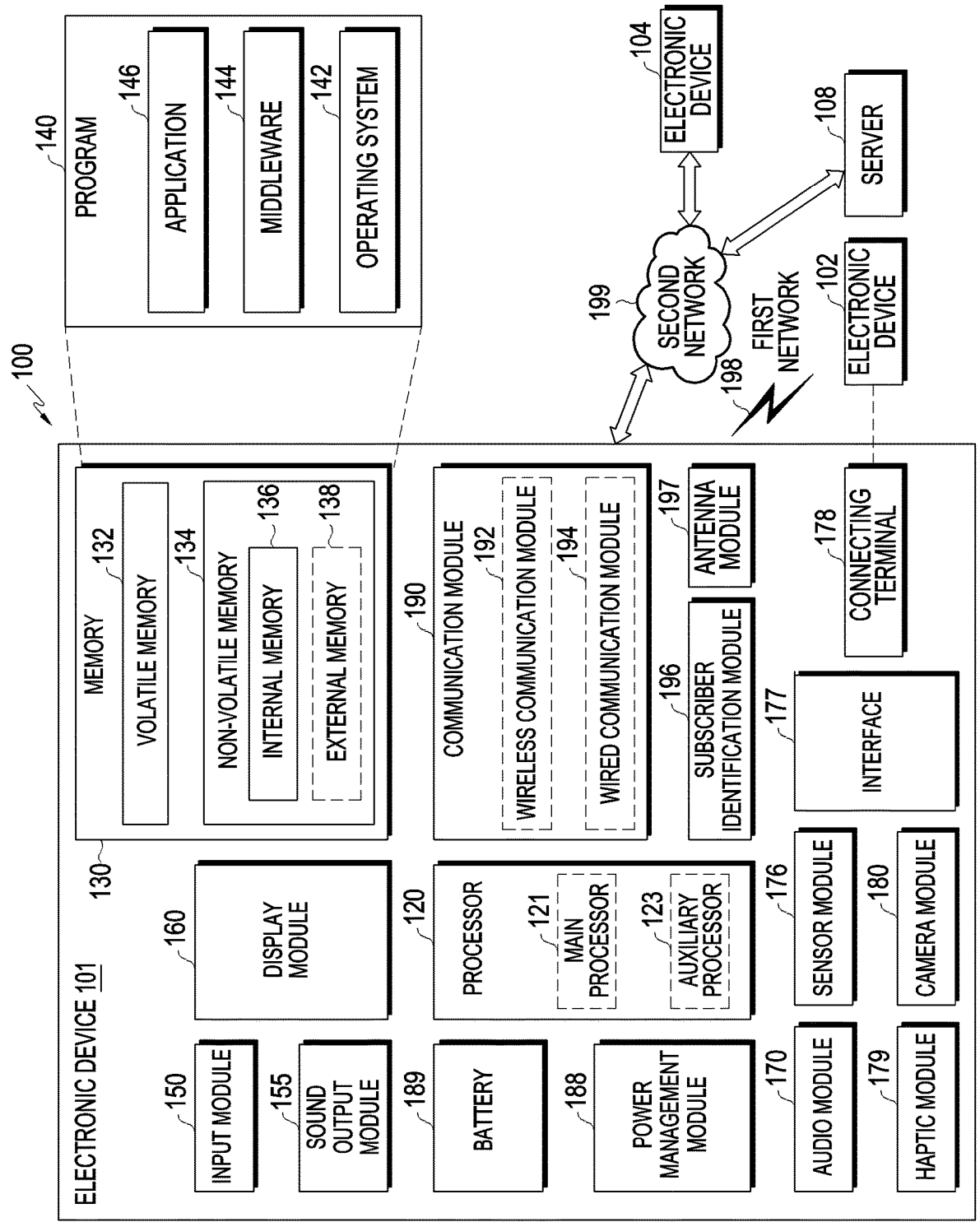
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In a certain embodiment, at least one of the components (e.g., the connecting terminal 178) may be omitted from the electronic device 101, or one or more other components may be added in the electronic device 101. In a certain embodiment, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., an electronic device). For example, a processor (e.g., a processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
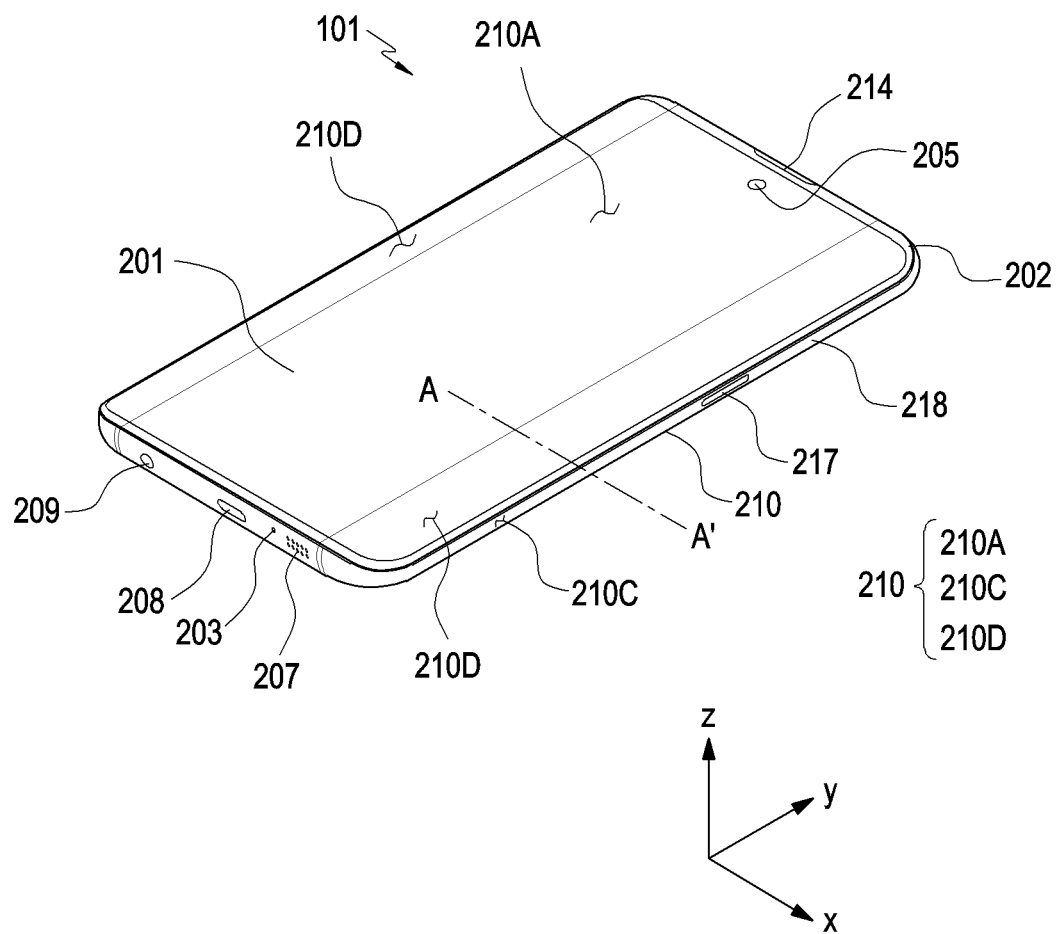
FIG. 2 is a front perspective view illustrating an electronic device according to an embodiment of the disclosure.
Figure 3:
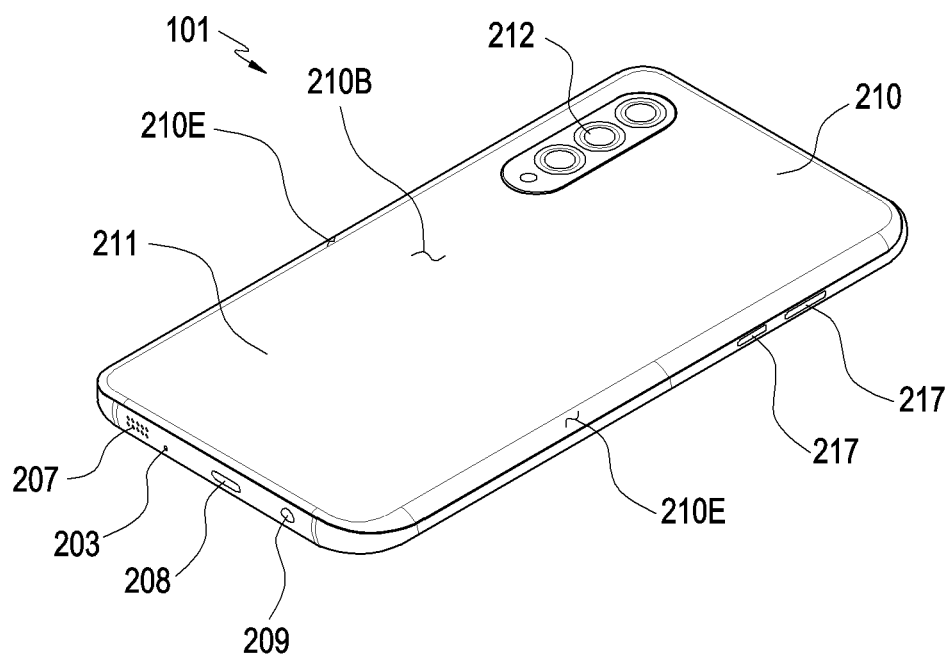
FIG. 3 is a rear perspective view illustrating an electronic device according to an embodiment of the disclosure.

FIG. 2 is a front perspective view illustrating an electronic device according to an embodiment of the disclosure. FIG. 3 is a rear perspective view illustrating an electronic device according to an embodiment of the disclosure.

Referring to FIGS. 2 and 3, 'Z' may refer to a thickness direction of the electronic device 101. Further, in an embodiment of the disclosure, '+Z' may refer to an upward direction of the electronic device, and '−Z' may refer to a downward direction of the electronic device.

Referring to FIGS. 2 and 3, the electronic device 101 according to an embodiment may include a housing 210 which includes a front surface 210A, a rear surface 210B, and side surfaces 210C surrounding a space between the front surface 210A and the rear surface 210B. In another embodiment (not shown), the housing 210 may refer to a structure that forms a portion of the front surface 210A of FIG. 2, the rear surface 210B of FIG. 2, and the side surfaces 210C. According to an embodiment, at least a portion of the front surface 210A may be formed by a front plate 202 (e.g., a glass plate, polymer plate, or cover glass including various coating layers) at least a portion of which is substantially transparent. The front plate 202 (e.g., a cover glass) may be formed of 2-dimension (2D) glass or 2.5-dimension (2.5D) glass. The rear surface 210B may be formed by a rear plate 211. The rear plate 211 may be formed of, for example, glass, ceramic, a polymer, a metal (e.g., aluminum, stainless steel (STS), or magnesium), or a combination of at least two of these materials. The side surfaces 210C may be coupled with the front plate 202 and the rear plate 211 and formed by a side bezel structure (or 'side member') 218 including a metal and/or a polymer. In a certain embodiment, the rear plate 211 and the side bezel structure 218 may be integrally formed and include the same material (e.g., glass, a metallic material such as aluminum, or ceramic).

In the illustrated embodiment, the front plate 202 may include two first edge regions 210D, which are bent and extend seamlessly from the front surface 210A toward the rear plate 211, at both long edge ends thereof. In the illustrated embodiment (see FIG. 3), the rear plate 211 may include two second edge regions 210E, which are bent and extend seamlessly from the rear surface 210B toward the front plate 202, at both long edge ends thereof. In a certain embodiment, the front plate 202 (or the rear plate 211) may include only one of the first edge regions 210D (or the second edge regions 210E). In another embodiment, some of the first edge regions 210D or the second edge regions 210E may not be included. In these embodiments, from the perspective of the side surfaces of the electronic device 101, the side bezel structure 218 may have a first thickness (or width) on a side surface that does not include any of the above first edge regions 210D or second edge regions 210E, and a second thickness less than the first thickness on a side surface that includes any of the above first edge regions 210D or second edge regions 210E.

According to an embodiment, the electronic device 101 may include at least one of a display 201, audio modules 203, 207, and 214 (e.g., the audio module 170 of FIG. 1), a sensor module (e.g., the sensor module 176 of FIG. 1), camera modules 205 and 212 (e.g., the camera module 180 of FIG. 1), key input devices 217 (e.g., the input module 150 of FIG. 1), or connector holes 208 and 209 (e.g., the connecting terminal 178 of FIG. 1). In a certain embodiment, the electronic device 101 may not be provided with at least one (e.g., the connector hole 209) of the components or may additionally include other components.

According to an embodiment, the display 201 may be visually exposed, for example, through a substantial portion of the front plate 202. In a certain embodiment, at least a portion of the display 201 may be exposed through the front plate 202 forming the front surface 210A and the first edge regions 210D. In a certain embodiment, a corner of the display 201 may be formed substantially in the same shape as that of an adjacent peripheral portion of the front plate 202. In another embodiment (not shown), a gap between the periphery of the display 201 and the periphery of the front plate 202 may be substantially equal to increase the visually exposed area of the display 201.

According to an embodiment, a surface (or the front plate 202) of the housing 210 may include a view area formed by visual exposure of the display 201. For example, the view area may include the front surface 210A and the first edge regions 210D.

In another embodiment (not shown), a recess or an opening may be formed in a portion of the view area (e.g., the front surface 210A and the first edge regions 210D) of the display 201, and at least one of the audio module 214, a sensor module (not shown), a light emitting element (not shown), or the camera module 205, which is aligned with the recess or the opening, may be included. In another embodiment (not shown), at least one of the audio module 214, a sensor module (not shown), the camera module 205, a fingerprint sensor (not shown), or a light emitting element (not shown) may be included on the rear surface of the view area of the display 201. In another embodiment (not shown), the display 201 may be incorporated with or disposed adjacent to a touch sensing circuit, a pressure sensor capable of measuring the intensity (pressure) of a touch, and/or a digitizer that detects a magnetic field-based stylus pen. In a certain embodiment, at least some of the key input devices 317 may be disposed in the first edge regions 210D and/or the second edge regions 210E.

According to an embodiment, the audio modules 203, 207, and 214 may include, for example, a microphone hole 203 and speaker holes 207 and 214. A microphone for obtaining an external sound may be disposed in the microphone hole 203, and in a certain embodiment, a plurality of microphones may be disposed to detect the direction of a sound. The speaker holes 207 and 214 may include an external speaker hole 207 and a receiver hole 214 for calls. In a certain embodiment, the speaker holes 207 and 214 and the microphone hole 203 may be implemented as a single hole, or a speaker (e.g., a piezo speaker) may be included without the speaker holes 207 and 214. The audio modules 203, 207, and 214 are not limited to the above structure, and may be subject to various design modifications, such as mounting only some audio modules or adding new audio modules depending on the structure of the electronic device 101.

According to an embodiment, the sensor module (not shown) may generate an electrical signal or data value corresponding to an internal operating state of the electronic device 101 or an external environmental state. The sensor module (not shown) may include, for example, a first sensor module (e.g., a proximity sensor) and/or a second sensor module (e.g., a fingerprint sensor), disposed on the front surface 210A, and/or a third sensor module (e.g., a heart rate monitor (HRM) sensor) and/or a fourth sensor module (e.g., a fingerprint sensor), disposed on the rear surface 210B of the housing 210. In a certain embodiment (not shown), the fingerprint sensor may be disposed on the rear surface 210B as well as on the front surface 210A (e.g., the display 201) of the housing 210. The electronic device 101 may further include a sensor module which is not shown, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor. The sensor module is not limited to the above structure, and may be subject to various design modifications, such as mounting only some sensor modules or adding new sensor modules depending on the structure of the electronic device 101.

According to an embodiment, the camera modules 205 and 212 may include a front camera module 205 disposed on the front surface 210A of the electronic device 101, and a rear camera module 212 and/or a flash (not shown) disposed on the rear surface 210B of the electronic device 101. The camera modules 205 and 212 may include one or more lenses, an image sensor, and/or an image signal processor. The flash may include, for example, a light emitting diode (LED) or a xenon lamp. In a certain embodiment, two or more lenses (an IR camera, a wide-angle lens, and a telephoto lens) and image sensors may be arranged on one surface of the electronic device 101. The camera modules 205 and 212 are not limited to the above structure, and may be subject various design modifications, such as mounting only some camera modules or adding new camera modules depending on the structure of the electronic device 101.

According to an embodiment, the electronic device 101 may include a plurality of camera modules (e.g., a dual camera or a triple camera), each with a different attribute (e.g., field of view) or function. For example, the electronic device 101 may include a plurality of camera modules 205 and 212 including lenses with different angles of view, and control to change the angles of view of the camera modules 205 and 212 based on a user selection. For example, at least one of the plurality of camera modules 205 and 212 may be a wide-angle camera, and at least another thereof may be a telephoto camera. Similarly, at least one of the plurality of camera modules 205 and 212 may be a front camera, and at least another thereof may be a rear camera. Further, the plurality of camera modules 205 and 212 may include at least one of a wide-angle camera, a telephoto camera, or an IR camera (e.g., a time of flight (TOF) camera or a structured light camera). According to an embodiment, the IR camera may operate as at least a portion of a sensor module. For example, the TOF camera may operate as at least a portion of a sensor module for detecting a distance to a subject.

In an embodiment, the key input devices 217 may be arranged on the side surfaces 210C of the housing 210. In another embodiment, the electronic device 101 may not include some or any of the key input devices 217, and the key input devices 217 which are not included may be implemented in other forms such as soft keys on the display 201. In a certain embodiment, the key input devices may include a sensor module disposed on the rear surface 210B of the housing 210.

The light emitting element (not shown) may be disposed, for example, on the front surface 210A of the housing 210. The light emitting element (not shown) may provide, for example, state information about the electronic device 101 in the form of light. In another embodiment, the light emitting element (not shown) may provide, for example, a light source interworking with an operation of the camera module 205. The light emitting element (not shown) may include, for example, an LED, an IR LED, and a xenon lamp.

According to an embodiment, the connector holes 208 and 209 may include a first connector hole 208 capable of accommodating a connector (e.g., a universal serial bus (USB) connector) for transmitting and receiving power and/or data to and from an external electronic device and/or a second connector hole (e.g., an earphone jack) 209 capable of accommodating a connector for transmitting and receiving an audio signal to and from an external electronic device.

According to an embodiment, some camera module 205 of the camera modules 205 and 212, and/or some of the sensor modules (not shown) may be disposed to be visually exposed to the outside through at least a portion of the display 201. For example, the camera module 205 may include a punch hole camera disposed inside a hole or recess formed on the rear surface of the display 201. According to an embodiment, the camera module 212 may be disposed inside the housing 210 such that a lens is visually exposed from the rear surface 210B of the electronic device 101. For example, the camera module 212 may be disposed on a PCB (e.g., a PCB 240 of FIG. 4).

According to an embodiment, the camera module 205 and/or a sensor module may be disposed to be in contact with an external environment through a transparent region from an internal space of the electronic device 101 to the front plate 202 of the display 201. Additionally, some sensor module may be disposed to execute its function without being visually exposed from the internal space of the electronic device through the front plate 202.

Figure 4:
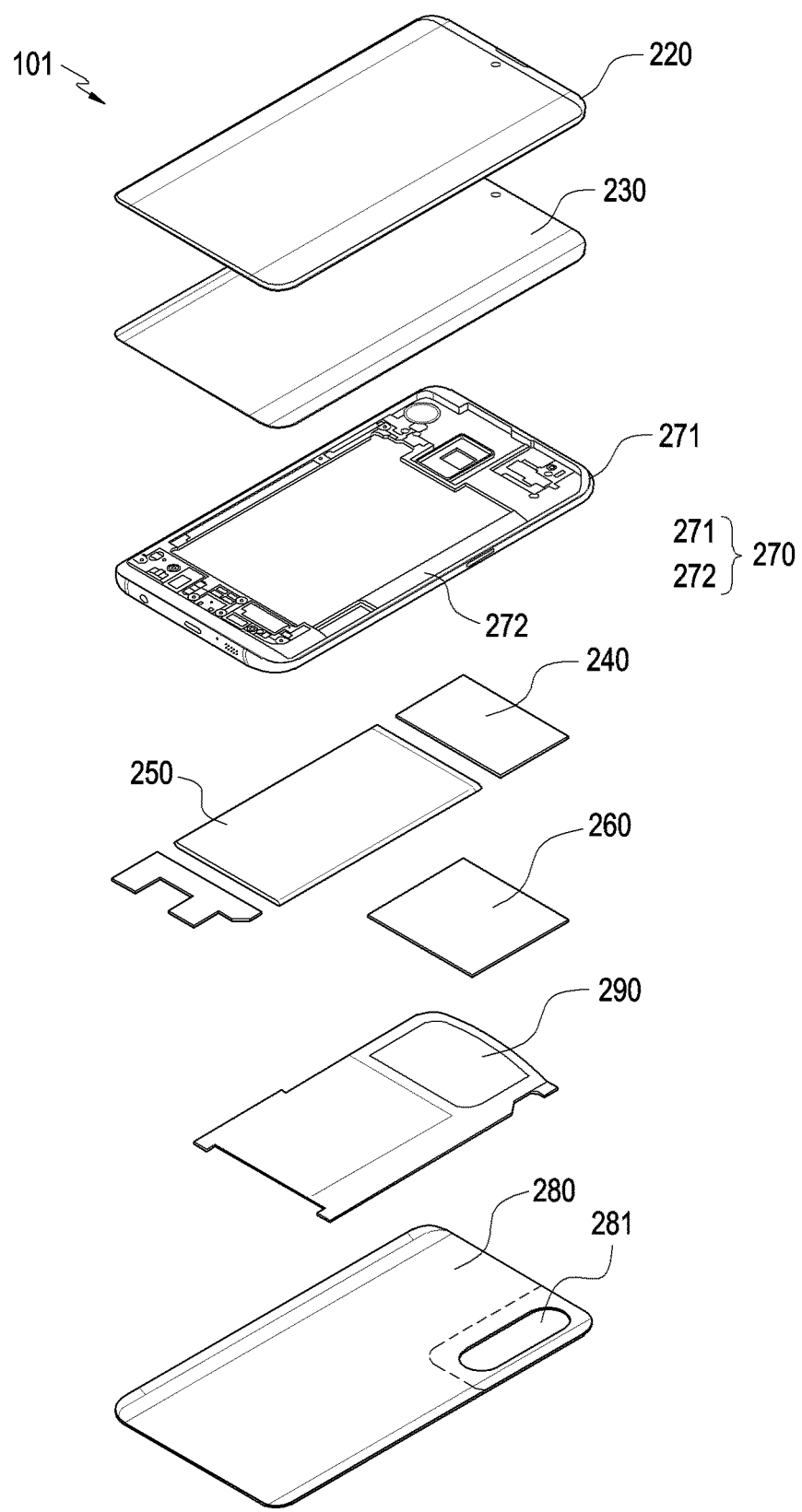
FIG. 4 is an exploded perspective view illustrating an electronic device according to an embodiment of the disclosure.

FIG. 4 is an exploded perspective view illustrating an electronic device according to an embodiment of the disclosure.

Referring to FIG. 4, the electronic device 101 (e.g., the electronic device 101 of FIGS. 1 to 3) according to various embodiments may include a support bracket 270, a front plate 220 (e.g., the front plate 202 of FIG. 2), a display 230 (e.g., the display 201 of FIG. 2), the PCB 240 (e.g., a PCB, a flexible PCB (FPCB), or a rigid flexible PCB (RFPCB)), a battery 250 (e.g., the battery 189 of FIG. 1), a second support member 260 (e.g., a rear case), an antenna 290 (e.g., the antenna module 197 of FIG. 1), and a rear plate 280 (e.g., the rear plate 211 of FIG. 2). The support bracket 270 of the electronic device 101 according to an embodiment may include a side bezel structure 271 (e.g., the side bezel structure 218 of FIG. 2) and a first support member 272.

In a certain embodiment, the electronic device 101 may not be provided with at least one (e.g., the first support member 272 or the second support member 260) of the components or may additionally include other components. At least one of the components of the electronic device 101 may be the same as or similar to at least one of the components of the electronic device 101 of FIG. 2 or FIG. 3, and a redundant description will be avoided herein.

According to various embodiments, the first support member 272 may be disposed inside the electronic device 101 and connected to the side bezel structure 271, or may be integrally formed with the side bezel structure 271. The first support member 272 may be formed of, for example, a metallic material and/or a non-metallic (e.g., polymer) material. The first support member 272 may have one surface coupled with the display 230 and the other surface coupled with the PCB 240.

According to various embodiments, a processor, memory, and/or an interface may be mounted on the PCB 240. The processor may include at least one of, for example, a central processing unit, an application processor, a graphics processing unit, an image signal processor, a sensor hub processor, or a communication processor. According to various embodiments, the PCB 240 may include a flexible printed circuit board type radio frequency cable (FRC). For example, the PCB 240 may be disposed on at least a portion of the first support member 272 and electrically coupled to an antenna module (e.g., the antenna module 197 of FIG. 1) and a communication module (e.g., the communication module 190 of FIG. 1).

According to an embodiment, the memory may include, for example, volatile memory or non-volatile memory.

According to an embodiment, the interface may include, for example, a high definition multimedia interface (HDMI), a USB interface, a secure digital (SD) card interface, and/or an audio interface. The interface may electrically or physically connect the electronic device 101 to an external electronic device, for example, and include a USB connector, an SD card/multimedia card (MMC) connector, or an audio connector.

According to various embodiments, the battery 250, which is a device for supplying power to at least one component of the electronic device 101, may include, for example, a non-rechargeable primary cell, a rechargeable secondary cell, or a fuel cell. At least a portion of the battery 250 may be disposed substantially on the same plane with the PCB 240, for example. The battery 250 may be disposed integrally inside the electronic device 101 or detachably from the electronic device 101.

According to various embodiments, the second support member 260 (e.g., the rear case) may be disposed between the PCB 240 and the antenna 290. For example, the second support member 260 may include one surface coupled with at least one of the PCB 240 or the battery 250 and the other surface coupled with the antenna 290.

According to various embodiments, the antenna 290 may be disposed between the rear plate 280 and the battery 250. The antenna 290 may include, for example, a near field communication (NFC) antenna, a wireless charging antenna, and/or a magnetic secure transmission (MST) antenna. The antenna 290 may, for example, perform short-range communication with an external device or wirelessly transmit and receive power for charging to and from an external device. In another embodiment, an antenna structure may be formed by a portion or combination of the side bezel structure 271 and/or the first support member 272.

According to various embodiments, the rear plate 280 may form at least a portion of the rear surface (e.g., the rear surface 210B of FIG. 3) of the electronic device 101. According to various embodiments, the rear plate 280 may include an opening 281 for disposing a camera therein. The opening may be formed at a position where a camera module (e.g., the camera module 212 of FIG. 3) is disposed.

Figure 5:
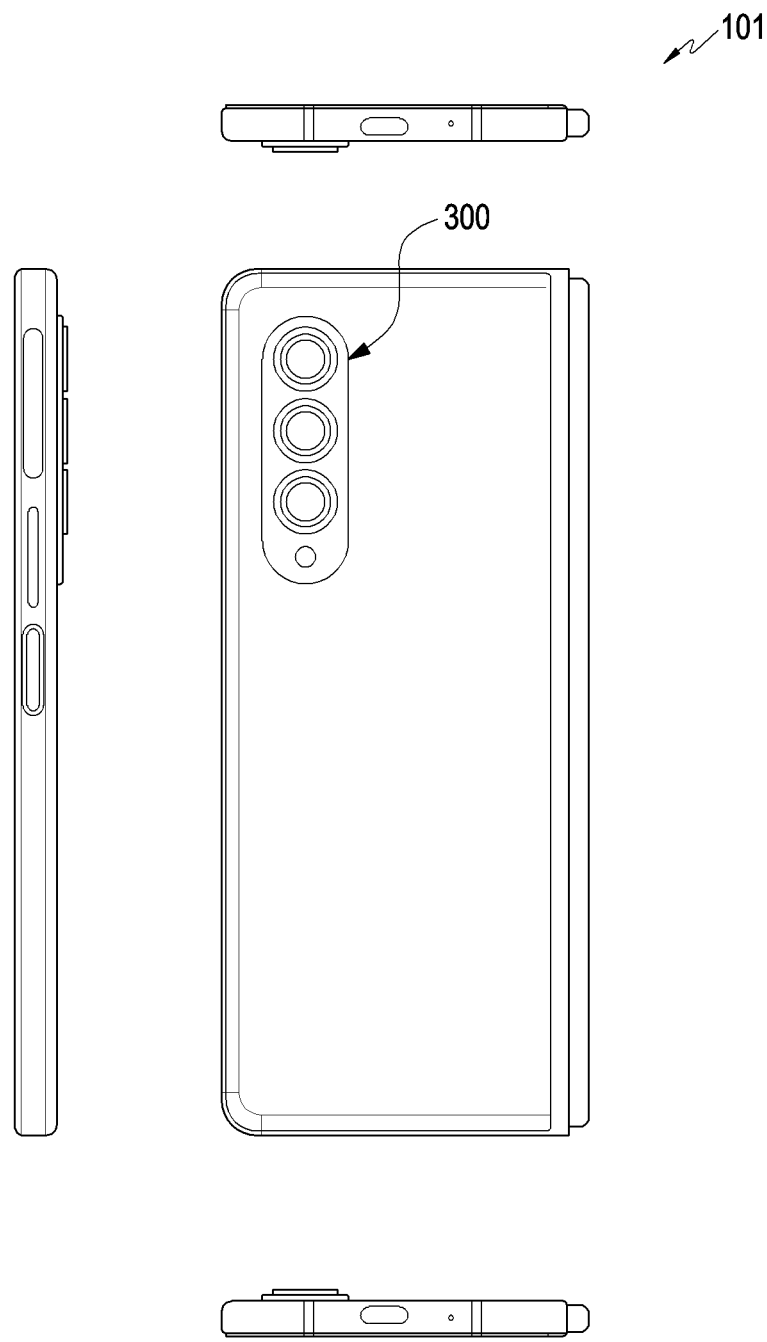
FIG. 5 is a rear view and side view illustrating an electronic device including a camera deco part according to an embodiment of the disclosure.
Figure 6:
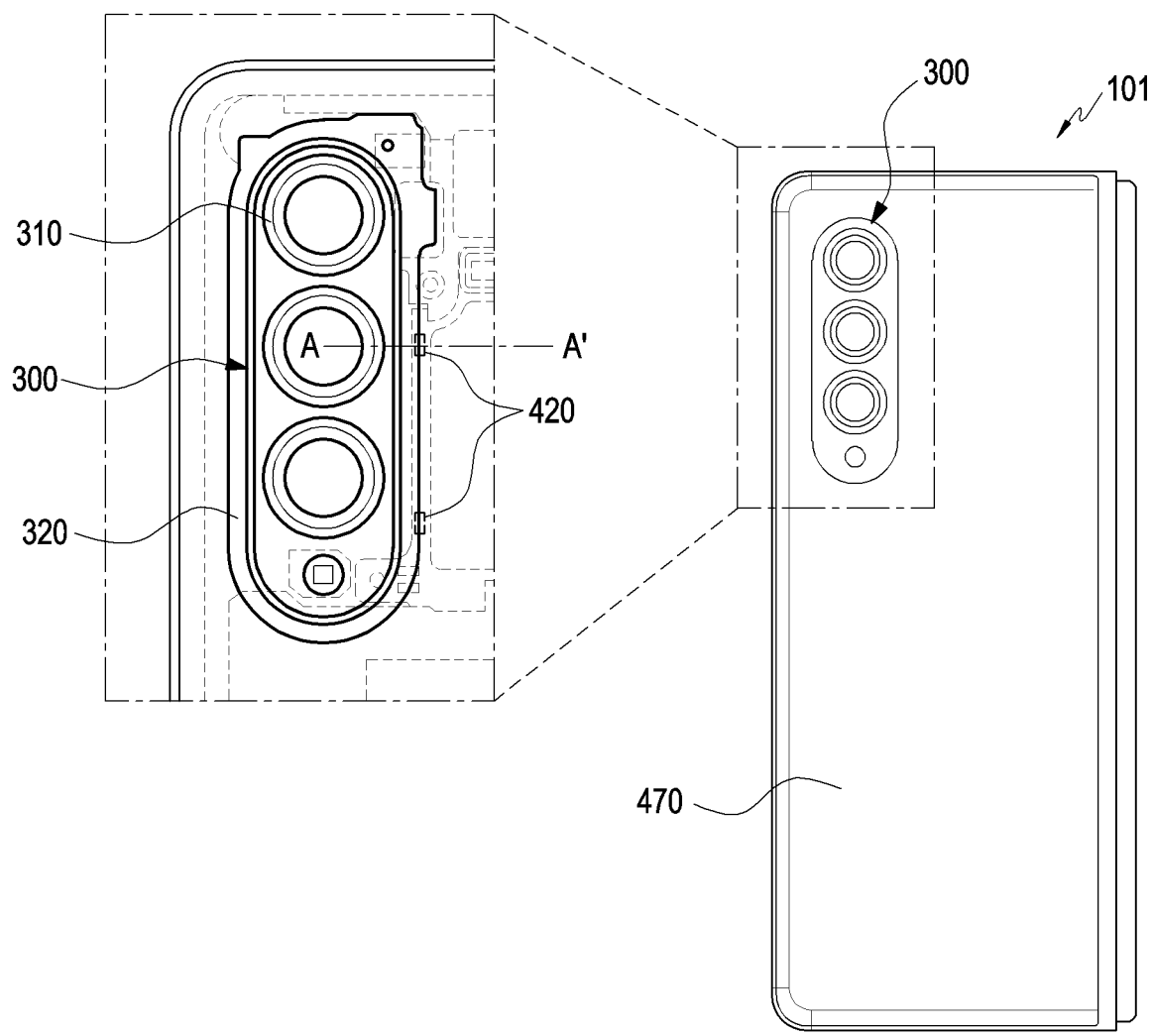
FIG. 6 is a rear view illustrating an electronic device including a camera deco part and an enlarged view illustrating the camera deco part according to an embodiment of the disclosure.
Figure 7:
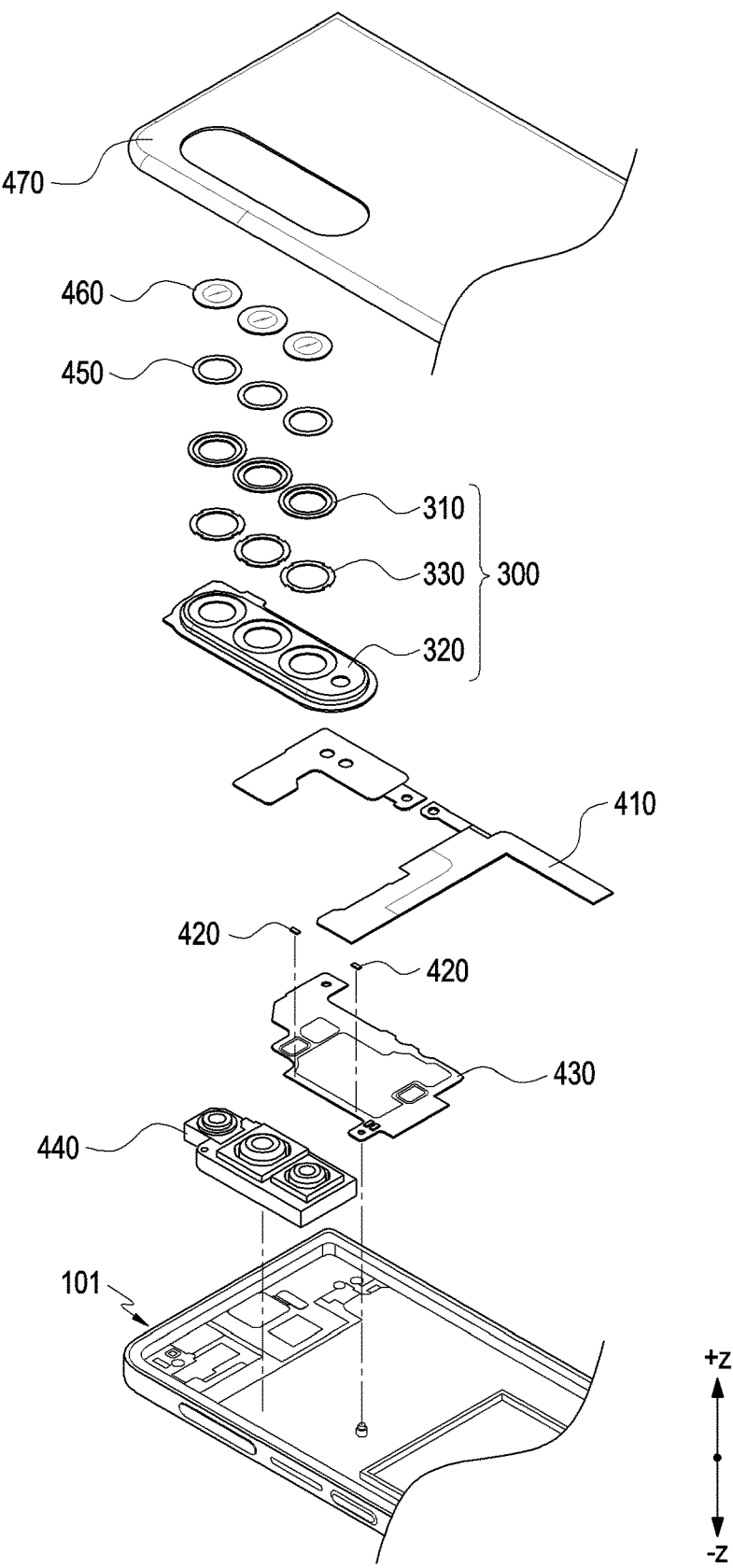
FIG. 7 is a rear exploded perspective view illustrating an electronic device including a camera deco part according to an embodiment of the disclosure.
Figure 8:
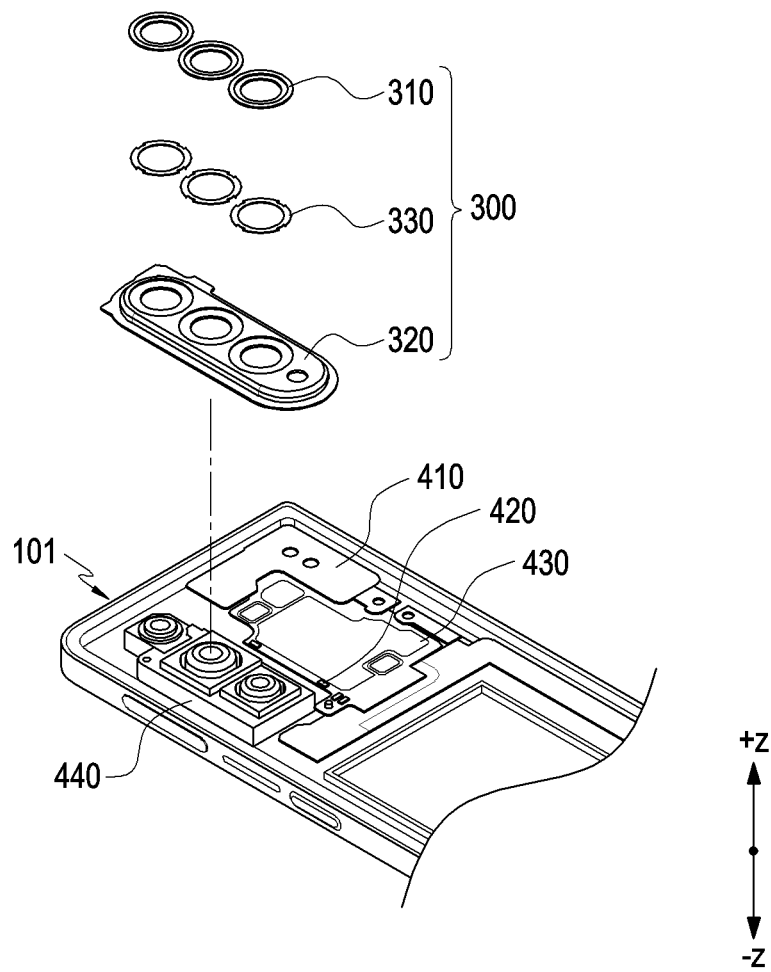
FIG. 8 is an exploded perspective view illustrating a camera deco part included in an electronic device according to an embodiment of the disclosure.

FIG. 5 is a front view and side view illustrating the electronic device 101 including a camera deco part 300 according to an embodiment of the disclosure. FIG. 6 is a rear view illustrating a rear plate 470 of the electronic device 101 including the camera deco part 300 and an enlarged view illustrating the camera deco part 300 according to an embodiment of the disclosure. FIG. 7 is a rear exploded perspective view illustrating the electronic device 101 including the camera deco part 300 according to an embodiment of the disclosure. FIG. 8 is an exploded perspective view illustrating the camera deco part 300 included in the electronic device 101 according to an embodiment of the disclosure.

Referring to FIGS. 5, 6, 7, and 8, the electronic device 101 according to various embodiments may include a camera assembly 440, a PCB 430, a conductive sponge 420, a second support member 410, the camera deco part 300, a second adhesive portion 450, and a camera window 460. The camera deco part 300 may include a first metal portion 310, a second metal portion 320, and a first adhesive portion 330. The configurations of the PCB 430, the second support member 410, and the camera deco part 300 of FIGS. 5, 6, 7, and 8 may be partially or wholly identical to those of the PCB 240, the second support member 260, and the rear camera module 212 of FIG. 4.

Referring to FIGS. 7 and 8, 'Z' may refer to the thickness direction of the electronic device 101. Further, in an embodiment of the disclosure, '+Z' may refer to the upward direction of the electronic device, and '−Z' may refer to the downward direction of the electronic device.

According to various embodiments, the camera deco part 300 covering the camera assembly 440 may include a metal portion (e.g., the first metal portion 310 and the second metal portion 320 of FIG. 6). Because the metal portion is located inside an opening of a rear plate 470 (e.g., the rear plate 280 of FIG. 4), the metal portion may be formed to be as large as or smaller than the opening. The metal portion may be exposed to the outside of the electronic device. The metal portion may include a plurality of camera openings (not shown) for exposing a camera lens of the camera assembly 440 to the outside. For example, the metal portion may include three camera openings. The metal portion may be formed with a portion surrounding the plurality of camera openings (not shown) projecting in the upward direction of the electronic device. Accordingly, the camera assembly 440 disposed in the downward direction of the camera deco part 300 may be protected. However, the size and shape of the metal portion and the number and shape of the plurality of openings are not limited to the above embodiment, and may be subject to various design modifications depending on the sizes or arrangement relationship of surrounding structures.

According to various embodiments, the camera deco part 300 covering the camera assembly 440 may include a plurality of metal portions, for design differentiation. For example, the camera deco part 300 may include the first metal portion 310 and the second metal portion 320. The second metal portion 320 may be disposed to face the top of the camera assembly 440 and correspond to a plurality of camera lenses forming the camera assembly 440. The second metal portion 320 may include a plurality of openings corresponding to the sizes of the plurality of camera lenses forming the camera assembly 440 and have a shape completely enclosing the plurality of camera lenses. The second metal portion 320 may be recessed in the downward direction (a −Z direction) to correspond to the size and shape of the first metal portion 310 and/or the first adhesive portion 330, such that the second metal portion 320 is aligned at a position corresponding to the first metal portion 310 and/or the first adhesive portion 330. The first metal portion 310 may be disposed to face the top of the second metal portion 320. The first metal portion 310 may be in the form of a plurality of rings including openings corresponding to the sizes of the plurality of camera lenses.

According to various embodiments, the bottom surface of the second metal portion 320 may be in contact with the conductive sponge 420, and the conductive sponge 420 may be in contact with the top surface of the PCB 430. The conductive sponge 420 may be disposed between the second metal portion 320 and the PCB 430 in contact with the second metal portion 320 and the PCB 430. Accordingly, when static electricity from the outside of the electronic device 101 is introduced into a camera module via the metal portions, the static electricity may be transferred to the PCB 430 via the second metal portion 320 and the conductive sponge 420. Accordingly, damage to the camera device and further effects on and damage to other modules disposed in the electronic device caused by static electricity introduced into the electronic device 101 through the camera module may be reduced. However, electrical connection between the second metal portion 320 and the PCB 430 may be accomplished through a conductor such as a c-clip or a conductive rubber as well as a conductive sponge.

According to various embodiments, the camera deco part 300 may include the first adhesive portion 330 which is located between the first metal portion 310 and the second metal portion 320 and attaches the first metal portion 310 and the second metal portion 320 to each other. The first adhesive portion 330 may be in the form of a plurality of rings including openings corresponding to the sizes of the plurality of camera lenses. The first adhesive portion 330 may be similar in size and shape to the first metal portion 310, or may be smaller in size than the first metal portion 310. The first adhesive portion 330 may be waterproof. According to various embodiments, the first adhesive portion 330 may be non-conductive. Therefore, when static electricity from the outside of the electronic device 101 is introduced into the camera deco part 300, the static electricity may not travel through the first adhesive portion 330.

According to various embodiments, the thickness of the first adhesive portion 330 may be set in consideration of prevention of degradation of electrostatic discharge (ESD) performance and slimming of the electronic device. For example, the thickness of the first adhesive portion 330 may be approximately 0.5 mm or less.

According to various embodiments, the camera window 460 may be disposed to face the top of the first metal portion 310 to protect the camera lenses. The electronic device 101 may include the second adhesive portion 450 between the camera window 460 and the first metal portion 310 to attach the camera window 460 and the first metal portion 310. The second adhesive portion 450 may be waterproof. The second adhesive portion 450 may be non-conductive.

Figure 9A:
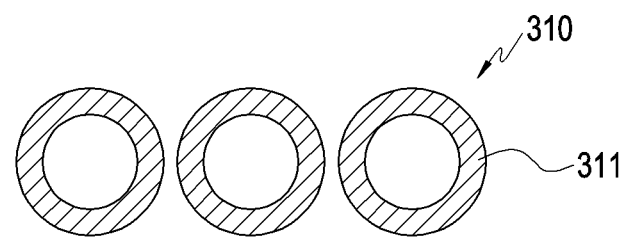
FIG. 9A is a diagram illustrating a bottom surface and an oxide coating layer-free portion of a first metal portion according to an embodiment of the disclosure.
Figure 9B:
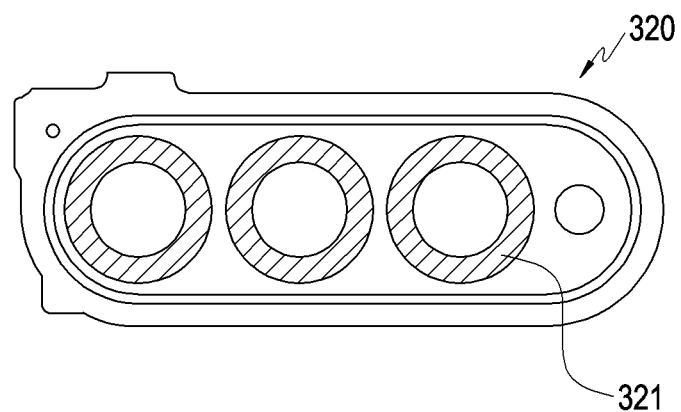
FIG. 9B is a diagram illustrating a top surface and an oxide coating layer-free portion of a second metal portion according to an embodiment of the disclosure.

FIG. 9A is a diagram illustrating the bottom surface and an oxide coating layer-free portion of the first metal portion 310 according to an embodiment of the disclosure. FIG. 9B is a diagram illustrating the bottom surface and an oxide coating layer-free portion of the second metal portion 320 according to an embodiment of the disclosure.

Referring to FIGS. 9A and 9B, the camera deco part 300 according to various embodiments may include the first metal portion 310 and the second metal portion 320. The configurations of the first metal portion 310 and the second metal portion 320 of FIGS. 9A and 9B may be partially or wholly identical to those of the first metal portion 310 and the second metal portion 320 of FIGS. 5, 6, 7, and 8.

According to various embodiments, the first metal portion 310 may include a first surface (not shown) on which an oxide coating layer is formed, and a second surface 311 on which an oxide coating layer is not formed. Referring to FIG. 9A, the second surface 311 on which the oxide coating layer is not formed may be a hatched portion. The second surface 311 may be a portion obtained by forming an oxide coating layer by anodizing and then peeling off at least a portion of a portion where the oxide coating layer is formed to form a conduction structure in consideration of ESD. This is because static electricity from the outside of the electronic device 101 should be transmitted to the PCB 430 disposed inside the electronic device 101 without being blocked by the oxide coating layer formed on the first metal portion 310. For example, the oxide coating layer may be peeled off using equipment such as a laser. According to various embodiments, the first surface on which the oxide coating layer is formed may be the top surface (e.g., in the +Z direction of FIG. 8) of the first metal portion 310, which may be exposed to the outside of the electronic device, and the second surface 311 on which the oxide coating layer is not formed may be the bottom surface (e.g., in the −Z direction of FIG. 8) of the first metal portion 310, which faces the second metal portion 320.

According to various embodiments, the second metal portion 320 may include a third surface (not shown) on which an oxide coating layer is formed, and a fourth surface 321 on which an oxide coating layer is not formed. The fourth surface 321 of the second metal portion 320, on which the oxide coating layer is not formed, may be a hatched portion in FIG. 9B. The fourth surface 321 may be a portion obtained by forming an oxide coating lager by anodizing and then peeling off at least a portion of a portion where the oxide coating layer is formed to form a conduction structure in consideration of ESD. This is because static electricity from the outside of the electronic device 101 should be transmitted to the PCB 430 disposed inside the electronic device 101 without being blocked by the oxide coating layer formed on the second metal portion 320. For example, the oxide coating layer may be peeled off using equipment such as a laser. According to various embodiments, the fourth surface 321 without the oxide coating layer formed thereon may be at least a portion of the top surface (e.g., in the +Z direction of FIG. 8) of the second metal portion 320, which faces the first metal portion 310. For example, the fourth surface 321 without the oxide coating layer formed thereon may be a recess 331 formed in the downward direction (e.g., the −Z direction of FIG. 8) in a shape corresponding to the first metal portion 310 and/or the first adhesive portion 330. The third surface with the oxide coating layer formed thereon may be any portion other than the fourth surface 321 facing the first metal portion 310.

According to various embodiments, when static electricity from the outside of the electronic device 101 is introduced into the camera module through the metal portions, the static electricity may be transferred to the PCB 430 through the first metal portion 310, the second metal portion 320, and the conductive sponge 420. However, at least a portion of the second surface 311 of the first metal portion 310 and the fourth surface 321 of the second metal portion 320 may be in contact with the first adhesive portion 330 which is non-conductive. Accordingly, the static electricity may migrate through a portion not in contact with the first adhesive portion 330 on the second surface 311 of the first metal portion 310 and a portion not in contact with the first adhesive portion 330 on the fourth surface 321 of the second metal portion 320. Accordingly, damage to the camera device and further effects on and damage to other modules disposed in the electronic device caused by static electricity introduced into the electronic device 101 through the camera module may be reduced.

Figure 10A:
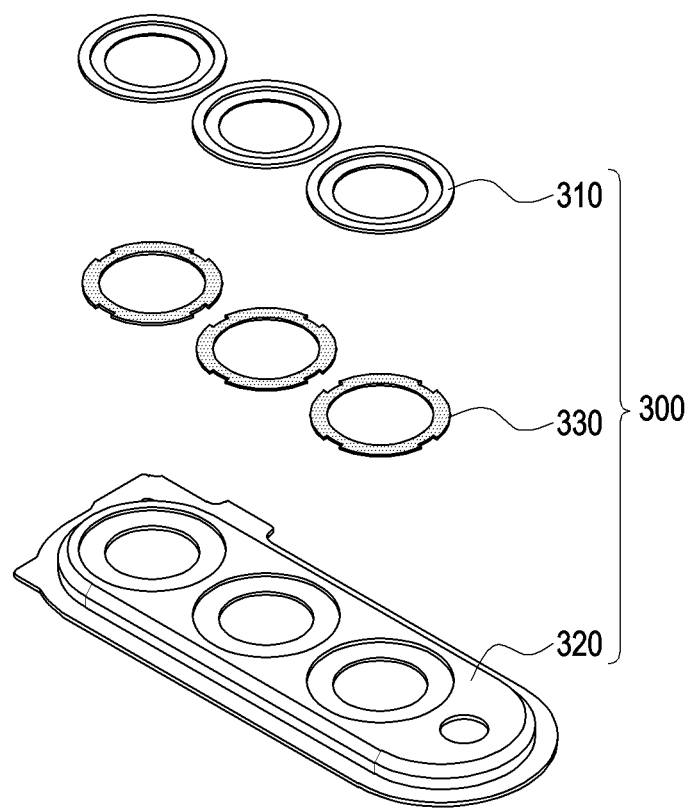
FIG. 10A is an exploded perspective view illustrating a camera deco part according to an embodiment of the disclosure.
Figure 10B:
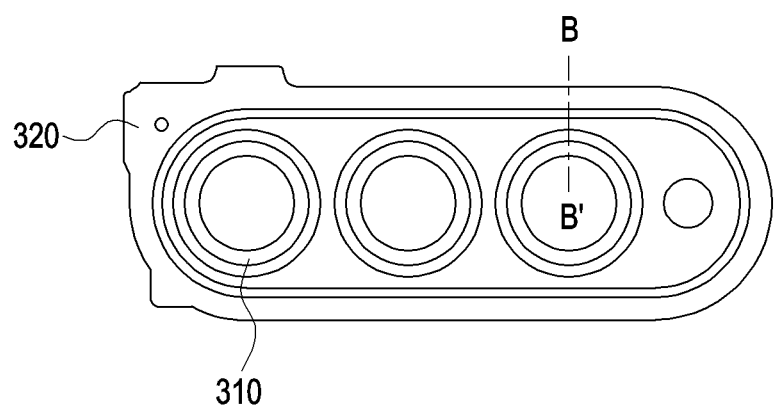
FIG. 10B is a front view illustrating a camera deco part according to an embodiment of the disclosure.
Figure 11A:
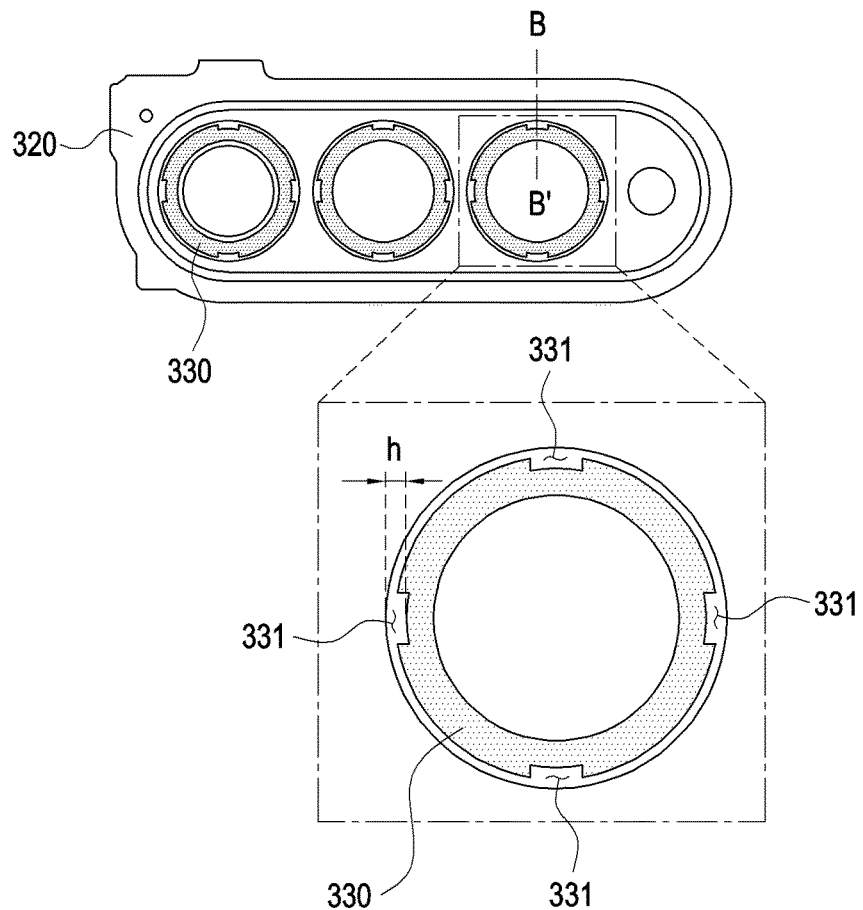
FIG. 11A is a front view illustrating an adhesive portion including at least one recess, and a second metal portion in combination, and an enlarged view illustrating the adhesive portion according to an embodiment of the disclosure.
Figure 11B:
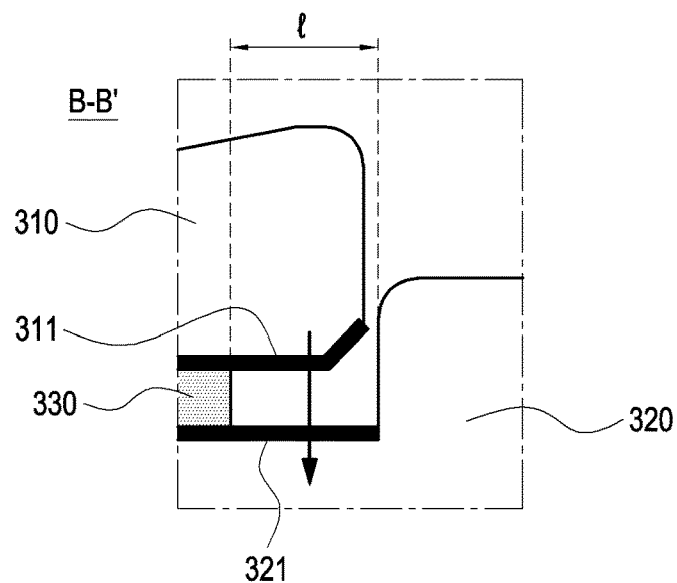
FIG. 11B is a cross-sectional view illustrating the camera deco part of FIG. 10B, taken along line B-B' according to an embodiment of the disclosure.
Figure 12A:
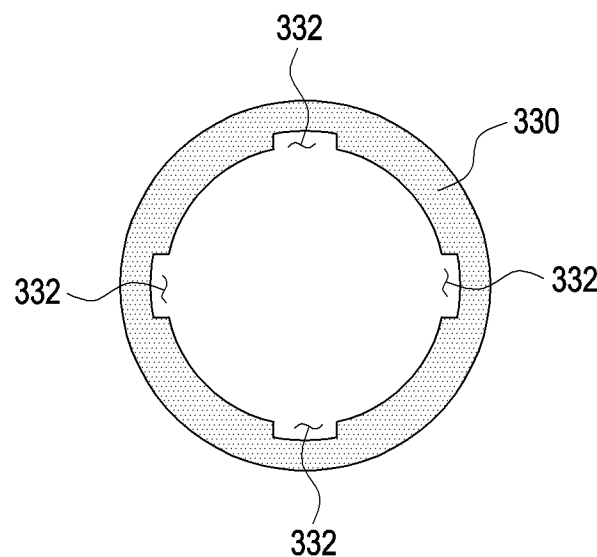
FIG. 12A is a front view illustrating an adhesive portion including at least one recess according to an embodiment of the disclosure.
Figure 12B:
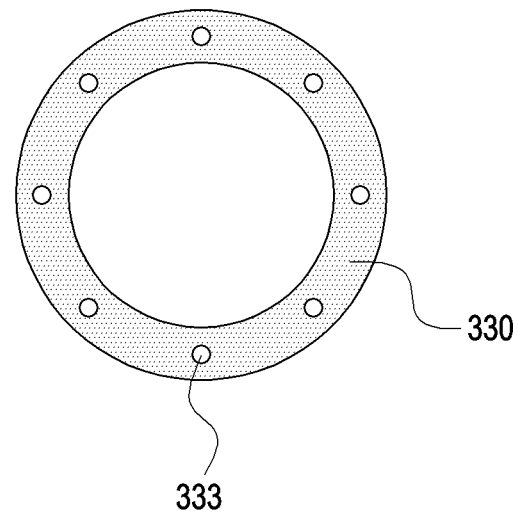
FIG. 12B is a front view illustrating an adhesive portion including at least one recess according to an embodiment of the disclosure.

FIG. 10A is an exploded perspective view illustrating the camera deco part 300 according to an embodiment of the disclosure. FIG. 10B is a front view illustrating the camera deco part 300 according to an embodiment of the disclosure. FIG. 11A is a front view illustrating the first adhesive portion 330 including at least one recess 331, and the second metal portion 320 in combination, and an enlarged view illustrating the first adhesive portion 330 according to an embodiment of the disclosure. FIG. 11B is a cross-sectional view illustrating the camera deco part 300 of FIG. 10B, taken along line B-B' according to an embodiment of the disclosure. FIG. 12A is a front view illustrating the first adhesive portion 330 including at least one recess 332 according to an embodiment of the disclosure. FIG. 12B is a front view illustrating the first adhesive portion 330 including at least one recess 333 according to an embodiment of the disclosure. The recesses 331, 332, and 333 may include, for example, recesses and/or openings.

Referring to FIGS. 10A, 10B, 11A, 11B, 12A, and 12B, the camera deco part 300 according to various embodiments may include the first metal portion 310, the second metal portion 320, and the first adhesive portion 330. The configurations of the first metal portion 310, the second metal portion 320, and the first adhesive portion 330 of FIGS. 10A, 10B, 11A, 11B, 12A, and 12B may be partially or wholly identical to those of the first metal portion 310, the second metal portion 320, and the first adhesive portion 330 of FIGS. 9A and 9B.

According to various embodiments, the first adhesive portion 330 may include at least one recess 331. For example, the first adhesive portion 330 may include four recesses 331. According to an embodiment, the recess 331 may be a portion cut inwardly from the outer periphery of the ring-shaped first adhesive portion 330. According to another embodiment, the recess 332 may be a portion cut outwardly from the inner periphery of the ring-shaped first adhesive portion 330. For example, the cut-out portion may be in the shape of "D". According to another embodiment, the recess 333 may be a plurality of openings formed in the ring-shaped first adhesive portion 330. Accordingly, the width of a portion where the first metal portion 310 and the second metal portion 320 face each other without contacting the first adhesive portion 330 may be increased by decreasing the width of at least a portion of the first adhesive portion 330. However, the cut shape of the recess 331 is not limited to the above embodiment, and may be subject to various design modifications depending on the size or arrangement relationship of external structures.

According to various embodiments, the distance between a side surface of the first adhesive portion 330 and an inner side surface of the second metal portion 320, which faces the first adhesive portion 330, may be, for example, approximately 0.2 mm. In this case, an area over which the first metal portion 310 and the second metal portion 320 are in contact without the first adhesive portion 330 (an area over which static electricity may travel) may be, for example, approximately 7.51 mm².

According to various embodiments, for a recessed portion of the first adhesive portion 330 including at least one recess 331, the distance h between an outer side surface of the recessed portion and an inner side surface of the second metal portion 320 may be, for example, approximately 0.5 mm to 0.7 mm. The distance h between the outer side surface of the recessed portion and the inner side surface of the second metal portion 320 may be, for example, approximately 0.6 mm. In this case, an area over which the first metal portion 310 and the second metal portion 320 may be in contact may be, for example, approximately 13.11 mm². For example, the area over which the first metal portion 310 and the second metal portion 320 may contact without the first adhesive portion 330 (i.e., the area over which static electricity may be conducted) may be approximately doubled by forming the recess 331. The width of the recessed portion of the first adhesive portion 330 including the recess 331 is not limited to the above embodiment, and may be subject to various design modifications. However, the width of the recessed first adhesive portion 330 should be at least 1 mm in order to maintain adhesion. According to various embodiments, contact between the first metal portion 310 and the second metal portion 320 may mean that the first metal portion 310 and the second metal portion 320 are physically connected, or electrically coupled without being physically connected. For example, contact between the first metal portion 310 and the second metal portion 320 may mean that static electricity flows between the first metal portion 310 and the second metal portion 320.

Figure 13A:
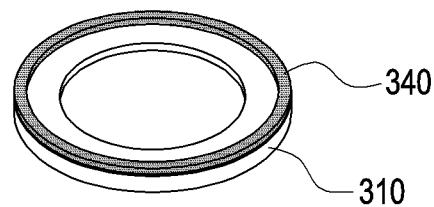
FIG. 13A is a rear perspective view illustrating a portion of a camera deco part including a rib according to an embodiment of the disclosure.
Figure 13B:
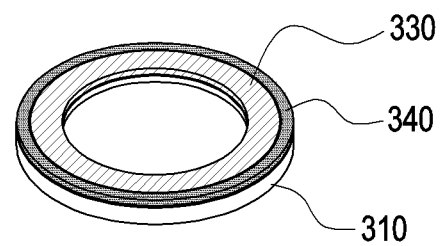
FIG. 13B is a rear perspective view illustrating a portion of a camera deco part further including a first adhesive portion in addition to FIG. 13A according to an embodiment of the disclosure.
Figure 13C:
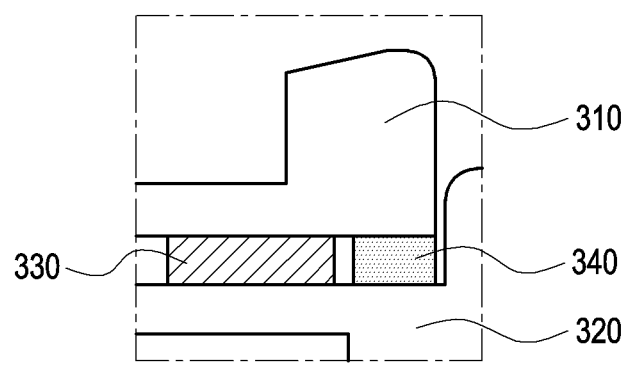
FIG. 13C is a cross-sectional view illustrating a camera deco part including a rib according to an embodiment of the disclosure.

FIG. 13A is a rear perspective view illustrating a portion of the camera deco part 300 including a rib 340, according to an embodiment of the disclosure. FIG. 13B is a rear perspective view illustrating a portion of the camera deco part 300 further including the first adhesive portion 330 in addition to FIG. 13A according to an embodiment of the disclosure. FIG. 13C is a cross-sectional view illustrating the camera deco part 300 including the rib 340 according to an embodiment of the disclosure.

Referring to FIGS. 13A, 13B, and 13C, the camera deco part 300 according to various embodiments may include the first metal portion 310, the second metal portion 320, the first adhesive portion 330, and the rib 340. The configurations of the first metal portion 310, the second metal portion 320, and the first adhesive portion 330 of FIGS. 13A, 13B, and 13C may be partially or wholly identical to those of the first metal portion 310, the second metal portion 320, and the first adhesive portion 330 of FIGS. 9A and 9B.

According to various embodiments, the camera deco part 300 may further include the rib 340 to provide an ESD conduction path between the first metal portion 310 and the second metal portion 320. The rib 340 may be in the shape of a ring with an outer diameter equal to that of the first metal portion 310 and a width smaller than that of the first metal portion 310. According to an embodiment, the inner diameter of the rib may be greater than the outer diameter of the first adhesive portion 330. Accordingly, the first metal portion 310 may contact the first adhesive portion 330 smaller than the first metal portion 310, and the rib 340 may contact a portion that does not contact the first adhesive portion 330 on the rear surface of the first metal portion 310. According to various embodiments, the rib 340 may be a conductor.

According to various embodiments, the rib 340 may be integrally formed with the first metal portion 310 and/or the second metal portion 320. For example, the rib 340 may be integrally formed with the first metal portion 310. For example, the rib 340 may be integrally formed with the second metal portion 320. In another example, the rib 340 may be formed independently of the first metal portion 310 or the second metal portion 320.

According to various embodiments, a path for conduction of static electricity may be secured through direct contact between the first metal portion 310 and the second metal portion 320.

Figure 14:
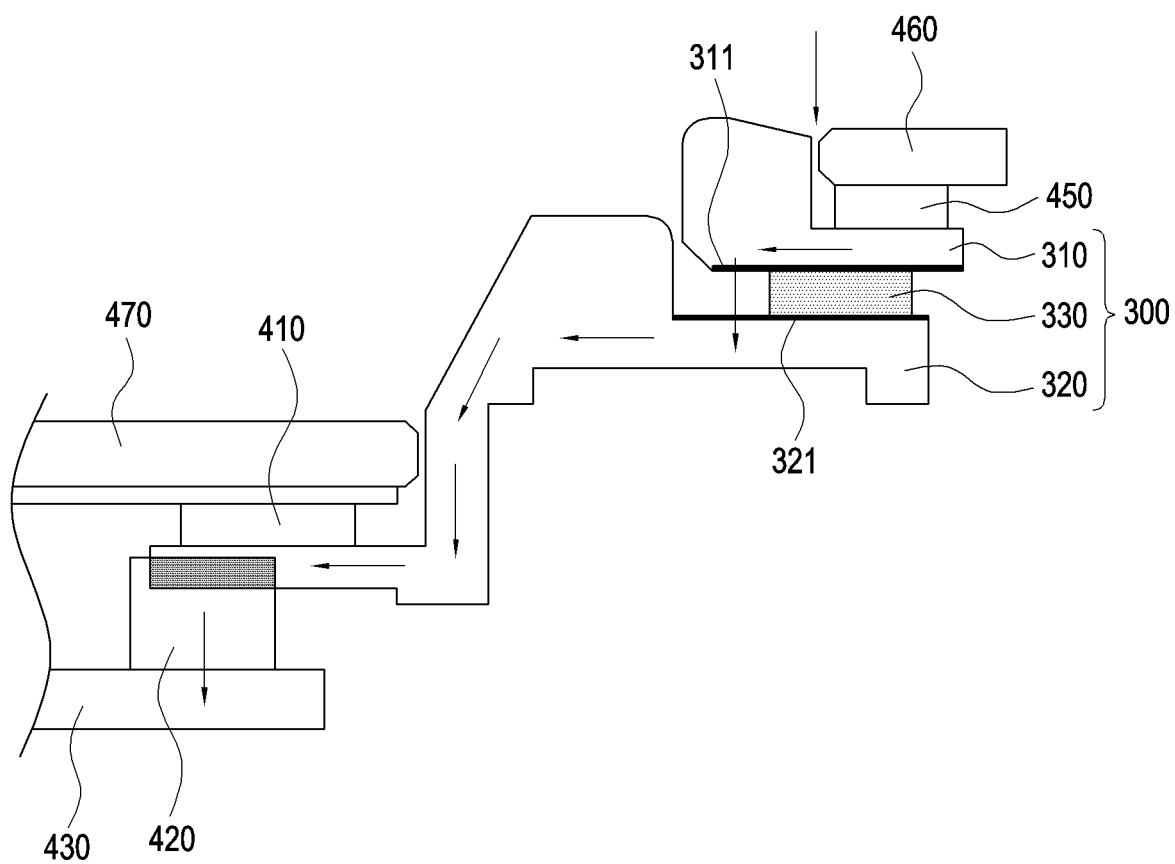
FIG. 14 is a cross-sectional view illustrating an electronic device including the camera deco part of FIG. 2, taken along line A-A' according to an embodiment of the disclosure.

FIG. 14 is a cross-sectional view illustrating the electronic device 101 including the camera deco part 300 of FIG. 2, taken along line A-A' according to an embodiment of the disclosure.

Referring now to FIG. 14, the electronic device 101 according to various embodiments may include the PCB 430, the conductive sponge 420, the second support member 410, the camera deco part 300, the second adhesive portion 450, and the camera window 460. The camera deco part 300 may include the first metal portion 310, the second metal portion 320, and the first adhesive portion 330. The configurations of the PCB 430, the conductive sponge 420, the second support member 410, the camera deco part 300, the second adhesive portion 450, and the camera window 460 of FIG. 14 may be partially or wholly identical to those of the PCB 430, the conductive sponge 420, the second support member 410, the camera deco part 300, the second adhesive portion 450, and the camera window 460 of FIG. 7.

Although the camera deco part 300 includes a single metal portion in a typical electronic device, it may include a plurality of metal portions (e.g., the first metal portion 310 and the second metal portion 320) for design differentiation in the disclosure. In the case where static electricity from the outside of the electronic device 101 is introduced into the camera module through the metal portions, when a portion of the static electricity transferred to the first metal portion 310 migrates to the second metal portion 320, the remaining static electricity unable to migrate to the second metal portion 320 may not be able to migrate to the PCB 430, thereby causing damage to the camera device or further affecting and damaging other modules disposed in the electronic device.

In the disclosure, when static electricity from the outside of the electronic device 101 is introduced into the camera module through the metal portions, the static electricity may travel through a portion not in contact with the first adhesive portion 330 on the second surface 311 of the first metal portion 310 without an oxide coating layer formed thereon. The static electricity may be introduced through a portion not in contact with the first adhesive portion 330 on the fourth surface 321 of the second metal portion 320 without an oxide coating layer formed thereon. The static electricity may be transferred from the second metal portion 320 to the PCB 430 via the conductive sponge 420 that contacts the second metal portion 320. As the conduction path of static electricity is widened, damage to the camera device and further effects on and damage to other modules disposed in the electronic device caused by static electricity introduced into the electronic device 101 through the camera module may be reduced.

An electronic device (e.g., the electronic device 101 of FIG. 1) according to various embodiments of the disclosure may include: a housing (e.g., the housing 210 of FIG. 2) including an opening; a PCB (e.g., the PCB 430 of FIG. 7) disposed inside the housing; and a camera deco part (e.g., the camera deco part 300 of FIG. 7) disposed inside the opening and covering a camera assembly. The camera deco part may include: a first metal portion (e.g., the first metal portion 310 of FIG. 7) including a first surface at least partially exposed to an outside of the electronic device, the first surface including an oxide coating layer formed thereon, and a second surface (e.g., the second surface 311 of FIG. 9A) including no oxide coating layer formed thereon; a second metal portion (e.g., the second metal portion 320 of FIG. 7) including a third surface at least partially exposed to the outside of the electronic device, the third surface including an oxide coating layer formed thereon, and a fourth surface (e.g., the fourth surface 321 of FIG. 9B) including no oxide coating layer formed thereon, the fourth surface facing the PCB; and a first adhesive portion (e.g., the first adhesive portion 330 of FIG. 7) located between the second surface of the first metal portion and the fourth surface of the second metal portion, the first adhesive portion including at least one recess.

According to various embodiments, the second surface may be a bottom surface of the first metal portion, and the fourth surface may include at least a portion of a top surface of the second metal portion.

According to various embodiments, at least a portion of the second surface and the fourth surface is in contact with the first adhesive portion.

According to various embodiments, when static electricity from the outside of the electronic device is introduced into the camera deco part through the first metal portion, the static electricity is transferred from a portion of the second surface of the first metal portion, which is not in contact with the first adhesive portion to a portion of the fourth surface of the second metal portion, which is not in contact with the first adhesive portion.

According to various embodiments, the first adhesive portion may include a waterproof material.

According to various embodiments, the first adhesive portion may be in the form of a plurality of rings including openings corresponding to a plurality of camera lenses forming the camera assembly.

According to various embodiments, the at least one recess (e.g., the recess 331 of FIG. 11A) may be formed to be concave inwardly from at least a portion of an outer periphery of the first adhesive portion.

According to various embodiments, the at least one recess (e.g., the recess 332 of FIG. 12A) may be formed to be concave outwardly from at least a portion of an inner periphery of the first adhesive portion.

According to various embodiments, the electronic device may further include a conductive sponge (e.g., the conductive sponge 420 of FIG. 7), and the conductive sponge may be disposed between the second metal portion and the PCB.

According to various embodiments, when static electricity from the outside of the electronic device is introduced into the camera deco part through the first metal portion, the static electricity may be transferred to the PCB through the first metal portion, the second metal portion, and the conductive sponge.

According to various embodiments, the electronic device may further include a rib (e.g., the rib 340 of FIG. 13A) located between the first metal portion and the second metal portion.

According to various embodiments, the electronic device may further include: a camera window facing a top of the first metal portion; and a second adhesive portion located between the camera window and the first metal portion.

A camera deco part covering a camera assembly in an electronic device (e.g., the electronic device 101 of FIG. 1) according to various embodiments of the disclosure may include: a first metal portion including a first surface at least partially exposed to an outside of the electronic device and the first surface including an oxide coating layer formed thereon and a second surface including no oxide coating layer formed thereon;

a second metal portion including a third surface at least partially exposed to the outside of the electronic device, the third surface including an oxide coating layer formed thereon and a fourth surface including no oxide coating layer formed thereon, and facing a PCB; and a first adhesive portion located between the second surface of the first metal portion and the fourth surface of the second metal portion, the first adhesive portion including at least one recess.

According to various embodiments, the second surface may be a bottom surface of the first metal portion, and the fourth surface may include at least a portion of a top surface of the second metal portion.

According to various embodiments, at least a portion of the second surface and the fourth surface is in contact with the first adhesive portion.

According to various embodiments, when static electricity from the outside of the electronic device is introduced into the camera deco part through the first metal portion, the static electricity may be transferred from a portion not in contact with the first adhesive portion on the second surface of the first metal portion to a portion not in contact with the first adhesive portion on the fourth surface of the second metal portion.

According to various embodiments, the first adhesive portion may include a waterproof material.

According to various embodiments, the first adhesive portion may be in the form of a plurality of rings including openings corresponding to a plurality of camera lenses forming the camera assembly.

According to various embodiments, the recess may be formed to be concave inwardly from at least a portion of an outer periphery of the first adhesive portion.

According to various embodiments, the recess may be formed to be concave outwardly from at least a portion of an inner periphery of the first adhesive portion.

The electronic device 101 including the camera deco part 300 according to various embodiments of the disclosure descried above is not limited by the foregoing embodiments and drawings, and it will be apparent to those skilled in the art that many replacements, variations, and modifications can be made inside the technical scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including an opening;
   a printed circuit board (PCB) disposed inside the housing; and
   a camera deco part disposed inside the opening and covering a camera assembly,
   wherein the camera deco part includes:
      a first metal portion including:
         a first surface at least partially exposed to an outside of the electronic device, the first surface including an oxide coating layer formed thereon, and
         a second surface including no oxide coating layer formed thereon, a second metal portion including:
         a third surface at least partially exposed to the outside of the electronic device, the third surface including an oxide coating layer formed thereon, and
         a fourth surface including no oxide coating layer formed thereon, the fourth surface facing the PCB, and
      a first adhesive portion located between the second surface of the first metal portion and the fourth surface of the second metal portion, the first adhesive portion including at least one recess.

2. The electronic device of claim 1,
   wherein the second surface is a bottom surface of the first metal portion, and
   wherein the fourth surface includes at least a portion of a top surface of the second metal portion.

3. The electronic device of claim 1, wherein at least a portion of the second surface and the fourth surface is in contact with the first adhesive portion.

4. The electronic device of claim 1, wherein, when static electricity from the outside of the electronic device is introduced into the camera deco part through the first metal portion, the static electricity is transferred from a portion of the second surface of the first metal portion, which is not in contact with the first adhesive portion, to a portion of the fourth surface of the second metal portion, which is not in contact with the first adhesive portion.

5. The electronic device of claim 1, wherein the first adhesive portion is in a form of a plurality of rings including openings corresponding to a plurality of camera lenses forming the camera assembly.

6. The electronic device of claim 1, wherein the at least one recess is formed to be concave inwardly from at least a portion of an outer periphery of the first adhesive portion.

7. The electronic device of claim 1, wherein the at least one recess is formed to be concave outwardly from at least a portion of an inner periphery of the first adhesive portion.

8. The electronic device of claim 1, further comprising:
   a conductive sponge,
   wherein the conductive sponge is disposed between the second metal portion and the PCB.

9. The electronic device of claim 8, wherein, when static electricity from the outside of the electronic device is introduced into the camera deco part through the first metal portion, the static electricity is transferred to the PCB through the first metal portion, the second metal portion, and the conductive sponge.

10. The electronic device of claim 1, further comprising:
    a rib located between the first metal portion the second metal portion.

11. The electronic device of claim 1, further comprising:
    a camera window facing a top of the first metal portion; and
    a second adhesive portion located between the camera window and the first metal portion.

12. A camera deco part covering a camera assembly in an electronic device, the camera deco part comprising:
    a first metal portion including:
       a first surface at least partially exposed to an outside of the electronic device, the first surface including an oxide coating layer formed thereon, and
       a second surface including no oxide coating layer formed thereon;
    a second metal portion including:
       a third surface at least partially exposed to the outside of the electronic device, the third surface including an oxide coating layer formed thereon, and
       a fourth surface including no oxide coating layer formed thereon, the fourth surface facing a printed circuit board (PCB); and a first adhesive portion located between the second surface of the first metal portion and the fourth surface of the second metal portion, the first adhesive portion including at least one recess.

13. The camera deco part of claim 12,
wherein the second surface is a bottom surface of the first metal portion, and
wherein the fourth surface includes at least a portion of a top surface of the second metal portion.

14. The camera deco part of claim 12, wherein at least a portion of the second surface and the fourth surface is in contact with the first adhesive portion.

15. The camera deco part of claim 12, wherein, when static electricity from the outside of the electronic device is introduced into the camera deco part through the first metal portion, the static electricity is transferred from a portion not in contact with the first adhesive portion on the second surface of the first metal portion to a portion not in contact with the first adhesive portion on the fourth surface of the second metal portion.

16. The camera deco part of claim 12, wherein the first adhesive portion is in a form of a plurality of rings including openings corresponding to a plurality of camera lenses forming the camera assembly.

17. The camera deco part of claim 12, wherein the at least one recess is formed to be concave inwardly from at least a portion of an outer periphery of the first adhesive portion.

18. The camera deco part of claim 12, wherein the at least one recess is formed to be concave outwardly from at least a portion of an inner periphery of the first adhesive portion.

19. The camera deco part of claim 12, further comprising:
a rib located between the first metal portion and the first adhesive portion.

20. The camera deco part of claim 12, wherein the second metal portion is aligned at a position corresponding to at least one of the first metal portion or the first adhesive portion.

* * * * *